US005373903A

United States Patent [19]

Lewis

[11] Patent Number: 5,373,903

[45] Date of Patent: Dec. 20, 1994

[54] MANUAL DUAL PURPOSE GARDEN TOOL

[76] Inventor: Walter M. Lewis, 1835 N. 650 E., Provo, Utah 84604

[21] Appl. No.: 236,556

[22] Filed: May 2, 1994

[51] Int. Cl.$^5$ .......................... A01B 1/14; A01B 1/16; A01B 1/20

[52] U.S. Cl. ................................ 172/375; 56/400.08; 172/378

[58] Field of Search ........... 56/400.08, 400.04, 400.05, 56/400.09, 400.21, 400.19; 172/371, 375, 378, 379, 380

[56] References Cited

U.S. PATENT DOCUMENTS 53,127 3/1866 Duvall .
488,817 12/1892 Jones .
1,592,270 7/1926 Johnson .
1,654,780 1/1928 Bersted .
1,919,396 7/1933 Sadler .
2,783,535 3/1957 Cesare .
2,908,131 10/1959 Ross .
3,152,788 10/1964 Hardwidge .
4,281,866 8/1981 Atcheson .
4,432,421 2/1984 Granberg .................... 56/400.08 X
4,630,366 12/1986 Fry .
4,815,778 3/1989 Hoch .
4,846,286 7/1989 McNeely et al. .
4,915,179 4/1990 Hawk ................................ 172/375
4,930,933 6/1990 Langenstein .................... 172/371 X
5,004,283 4/1991 Sullivan .

*Primary Examiner*—Stephen J. Novosad
*Attorney, Agent, or Firm*—Lockwood, Alex, FitzGibbon & Cummings

[57] ABSTRACT

A self-cleaning, dual purpose, manual garden tool that can be used either as a weeder or as a cultivator. The tool has an elongated body that serves as a handle. The body is longitudinally split into two parts which are pivotally joined at one end. When the two parts are brought together they mate so as to form a single body. A blade formed of laterally spaced tines is mounted at the pivoted end of one body part so as to form a longitudinal extension of that body part. Another blade formed of laterally spaced tines is mounted on the pivoted end of the other body part so as to form a transverse extension thereof. When the tool is used as a weeder the longitudinally extending blade is shoved in the soil underneath a weed and the weed is lifted by a prying action. When the tool is used as a cultivator the transversely extending blade is used to scarify the top soil and dig out weeds. When the two parts of the body are spread apart the spaced tines on one blade intermesh with the spaced tines on the other blade so as to remove any dirt or debris lodged between the blades thereby rendering the tool self-cleaning.

8 Claims, 4 Drawing Sheets

15B
11
5
8
7
12
16
10
15A
15
6
5
11
7
14
10
12
13
23
8

15
5
7
16
8

5
7
16
15

MANUAL DUAL PURPOSE GARDEN TOOL

BACKGROUND AND DESCRIPTION OF THE INVENTION

This invention relates generally to innovations and improvements in manual garden tools. More particularly, it relates to innovations and improvements in manual garden tools which have a dual purpose in that they can be used in one way to pry weeds, such as clumps of crab grass, upwardly from the soil and may be used in another way as a cultivator to scarify the soil top surface. After the tool has been used in either way, it may be operated so as to be self-cleaning.

The tool of the present invention is particularly useful by gardeners who have flower beds or vegetable gardens and have a need for a small manual tool which can be used for both removing weeds and for cultivating the soil around flower or vegetable plants. The tool of the present invention serves both as a weeder and as a cultivator. It has the further advantage of being self-cleaning after it has been used either as a weeder or as a cultivator.

The object of the invention, generally stated, is the provision of a manual dual purpose garden tool which has a rugged construction and is formed of a two-part body, a plurality of identical tines and a pivot pin all components being formable on a quantity production basis at relatively low cost.

Briefly, the tool of the present invention comprises an elongated longitudinally spread body formed of two mating parts which are pivotally connected adjacent one end by a pivot pin on which two separate blades are mounted. Each of the blades takes the form of a plurality of spaced pointed tines with each tine having an integrally formed projection which fits into a pocket in one of the body parts so as to maintain all of the tines forming one of the blades in an aligned condition.

When the two body parts are mated together they form a single handle which the user can grasp in one hand with one of the blades extending in the longitudinal direction from the pivoted end of the tool. In this condition of the tool, the other blade extends generally transversely to the tool body.

With the tool parts of the body mated or closed together, the tool can be used to pry up weeds from the soil. Alternatively, it can be used as a cultivator to scarify the soil top surface. After having been used for either purpose, upon spreading apart the tool body parts, the spaced tines of the two blades are intermeshed to form a substantially solid blade thereby cleaning the tool by removing any dirt or foreign matter that has become stuck between the tines of either blade.

For a more complete understanding of the nature and scope of the invention, reference may now be had to the following detailed description of a preferred embodiment taken in conjunction with the accompanying drawings wherein.

Figures 1, 2:
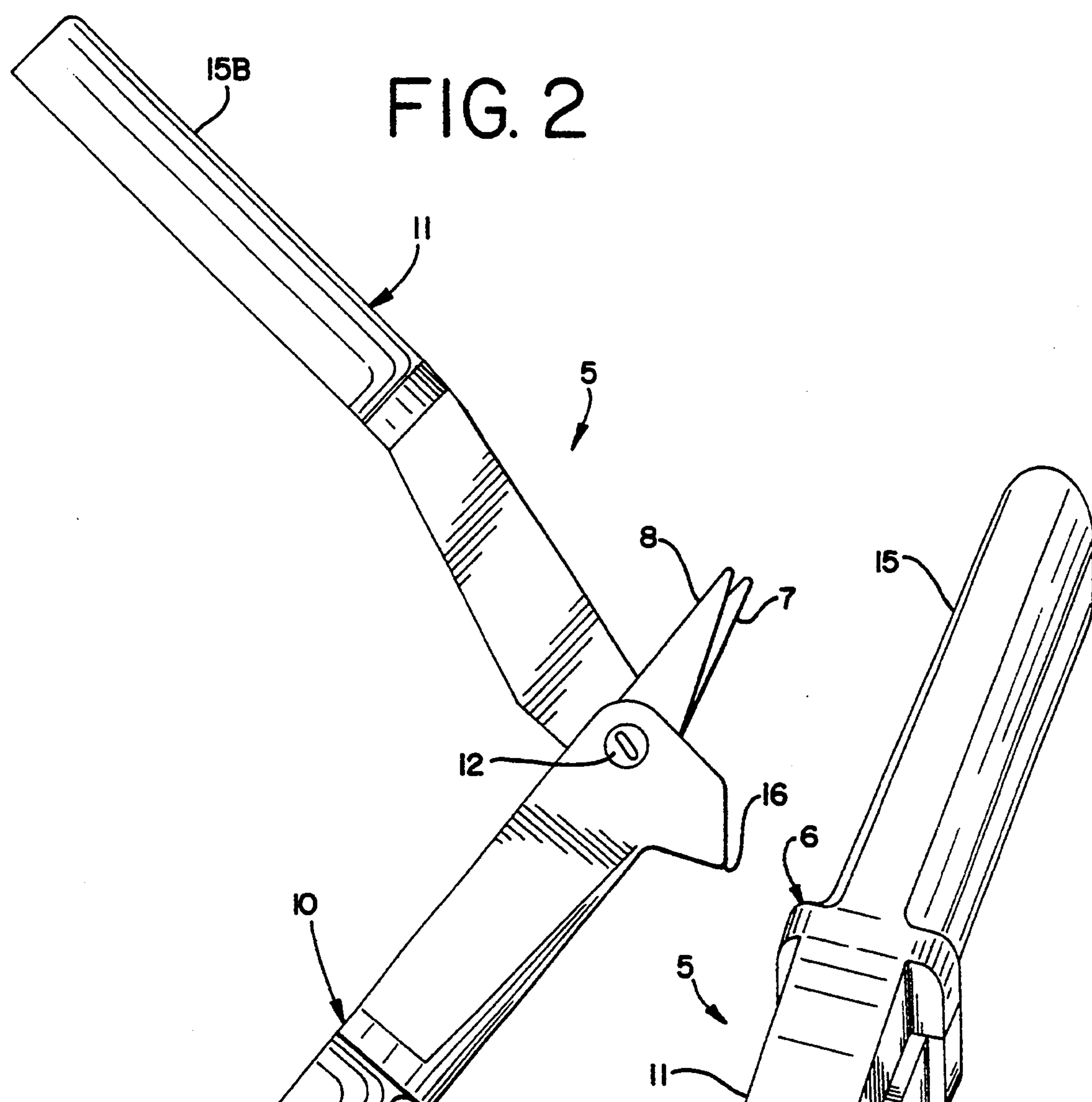
FIG. 1 is a perspective view of a tool forming one embodiment of the invention in what may be considered its closed or normal condition for use either as a weeder or as a cultivator.
FIG. 2 is a perspective view of the tool shown in FIG. 1 in its self-cleaning condition.

Referring to FIGS. 1 and 2, the manual dual purpose garden tool of the present invention is indicated generally at 5 therein and having a tool body indicated generally at 6 and two blades indicated generally at 7 and 8.

The body 6 is formed in two mating parts indicated generally at 10 and 11 in FIG. 2. The mating parts 10 and 11 are pivotally joined together adjacent one end of the body 6 on a pin 12. As shown in FIG. 1, the blade 8 is formed of six identical tines 13 while the blade 7 is formed of five spaced tines 14-14. It will be seen that the spaced tines 13 and 14 are alternately mounted on the pin 10 so that each set of blades 13 and 14 serve as spacers for each other. This arrangement allows the tines 13 and 14 to intermesh into a more or less solid blade as shown in FIG. 2. It will be understood that the number of tines in the blades 7 and 8 may be equal or that there may be fewer or more tines depending on the size of the tool. However, it has been found that having six spaced tines in blade 8 and five in blade 7 constitutes a useful and satisfactory number.

Figure 3:
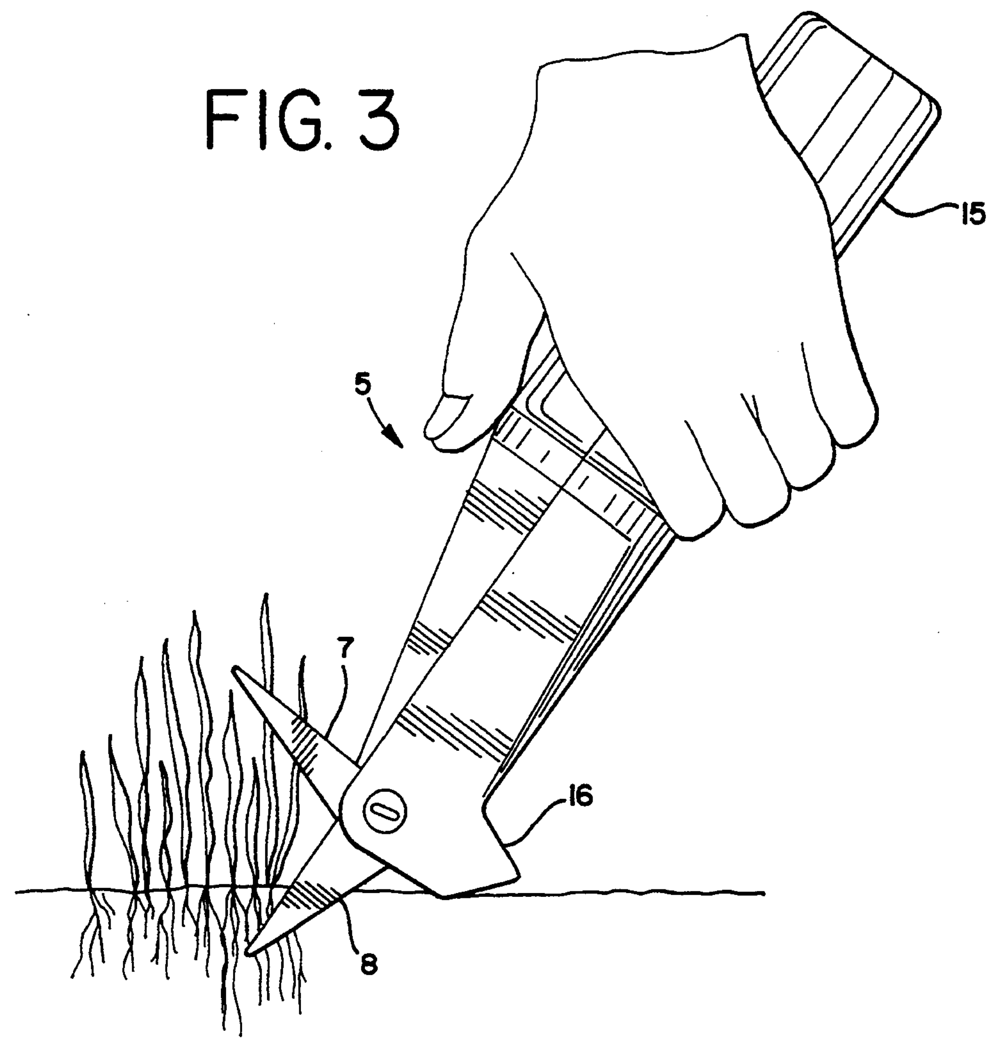
FIGS. 3 and 4 are illustrative views showing how the tool of FIG. 1 is used as a weeder to pry up a weed out of the soil.
Figure 4:
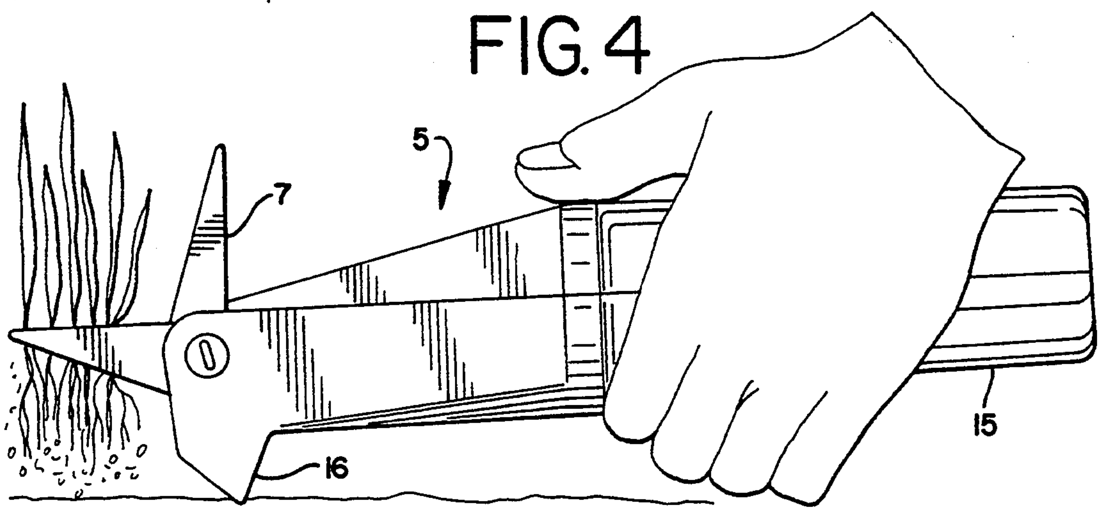
Figure 5:
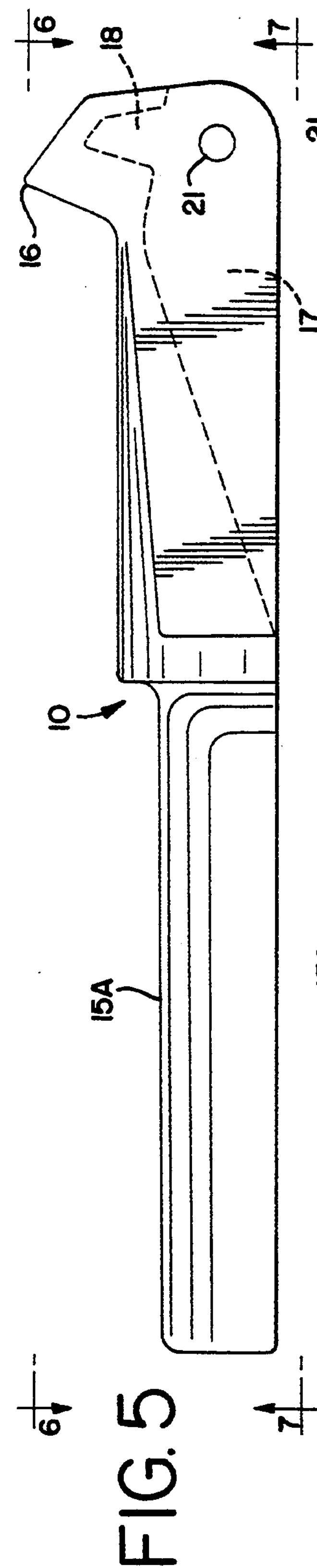
FIG. 5 is a side elevational view of one of the parts forming the body of the tool of FIGS. 1-4.
Figure 6:
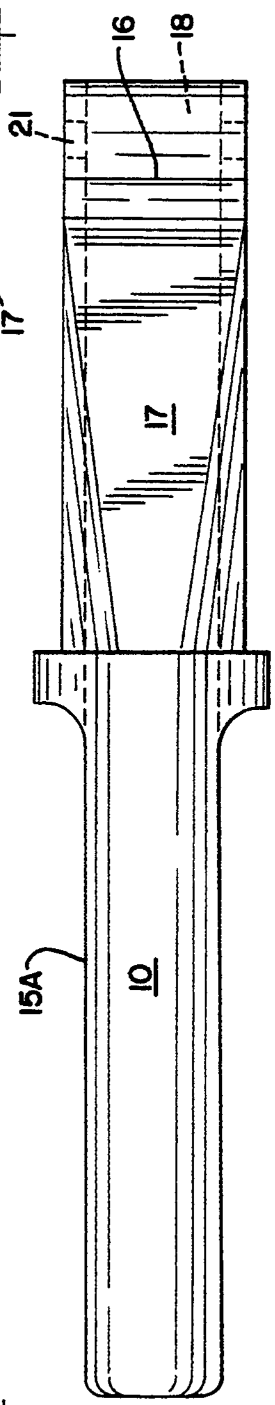
FIG. 6 is a plan view taken on line 6—6 of FIG. 5.
Figure 7:
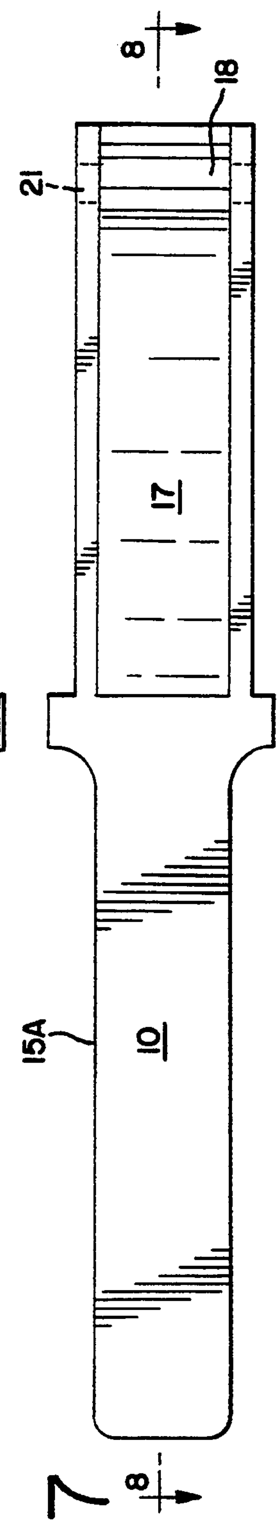
FIG. 7 is a plan view taken on line 7—7 of FIG. 5.

As mentioned above, the manner in which the tool of FIGS. 1 and 2 is used as a weeder to pry up and remove a weed from the soil is illustrated in FIGS. 3 and 4. The tool 5 is in its closed condition and the grip portion 15 of the body 6 is grasped in one hand and the blade 8 is pushed down into the soil underneath the weed to be removed as illustrated in FIG. 3. Since the blade 8 is formed by the pointed spaced tines 13, it readily penetrates the solid to a depth at which a fulcrum 16 integrally formed on the body part 10 engages the top surface of the soil or ground.

The gardener having inserted the tool 5 into the soil underneath the weed to be removed as shown in FIG. 3, the tool is rotated about the fulcrum 16 as illustrated in FIG. 4 so as to pry up the weed out of the soil. The weed may be either forcibly removed from the blade 8 or shaken loose therefrom. Depending upon the soil conditions, there will usually be some of the soil or other debris or parts of the weed trapped between the spaced tines forming the blade 8. Such trapped dirt or debris can be readily removed by spreading the two parts 10 and 11 of the body 6 as shown in FIG. 2. Upon spreading the body parts, the spaced tines 14 of blade 7 enter into the spaces between the tines 13 of blade 8 thereby dislodging the trapped material and cleaning the blade 8 for the next use.

It will be understood without need for an illustration that by orienting the tool 5 so that the blade 7 is pointed down toward the ground, the tool 5 can be used as a cultivator. By so using the tool 5 in its inverted position from that shown in FIG. 4, the tool can be used as a pick to scarify the soil and thereby cultivate around individual plants. As soil or debris becomes trapped or wedged between the tines 14 of the blades 7 when the tool is used as a cultivator, it may be dislodged and the blade 7 cleaned by opening the two body parts 10 and 11 as shown in FIG. 2 as described above.

Having described the general construction of the tool 5 and the manner in which it is used in connection with FIGS. 1–4, the details of construction of the tool 5 can now be described in connection with FIGS. 5–12.

When the tool 5 is oriented with respect to the ground as shown in FIG. 4, the transverse edge 16*a* (FIG. 4) on the fulcrum 16 allows it to be used for scraping troughs for shallow seed planting and surface leveling.

Figure 8:
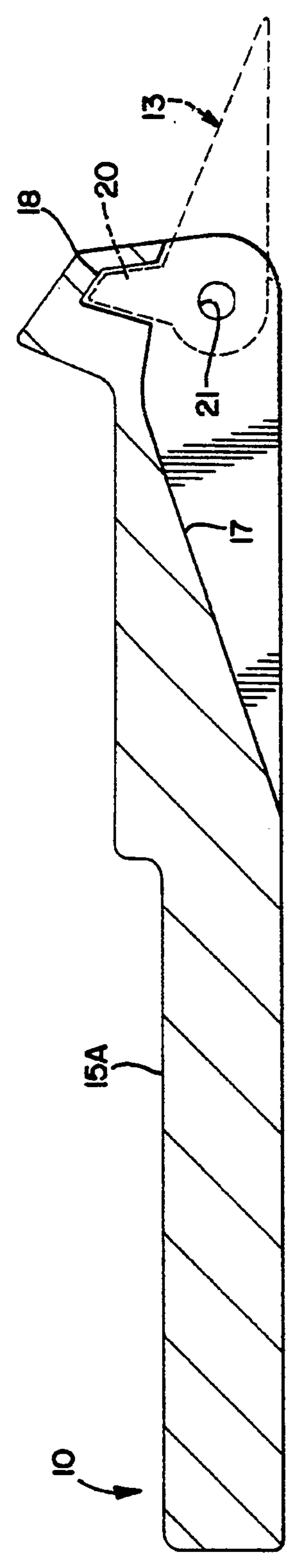
FIG. 8 is a longitudinal sectional view taken on line 8—8 of FIG. 7.

Referring to FIGS. 5–8, the body part 10 includes a handle grip 15A on one end and the fulcrum 16 on the other end. Between the grip 15A and the fulcrum end the body part 10 has a cavity indicated generally at 17. The cavity 17 includes a pocket 18 which has a shape in which the finger-like projection 20 (FIG. 12) on each tine 13 fits as shown in FIG. 8 wherein a tine 13 is shown in broken line. At its fulcrum end the body part 10 has aligned apertures 21—21 through which the pivot pin 12 extends. Each tine 13 and 14 has an aperture 22 dimensioned to slidably fit on pivot pin 12. It will be seen that the finger-like projections 20 co-act with the pocket 18 to prevent the laterally spaced tines 13 from rotating or turning on the pin 16 whereby the blade 8 comprised of the tines 13 forms a relatively rigid extension on the fulcrum end of the body part 10.

Figure 9:
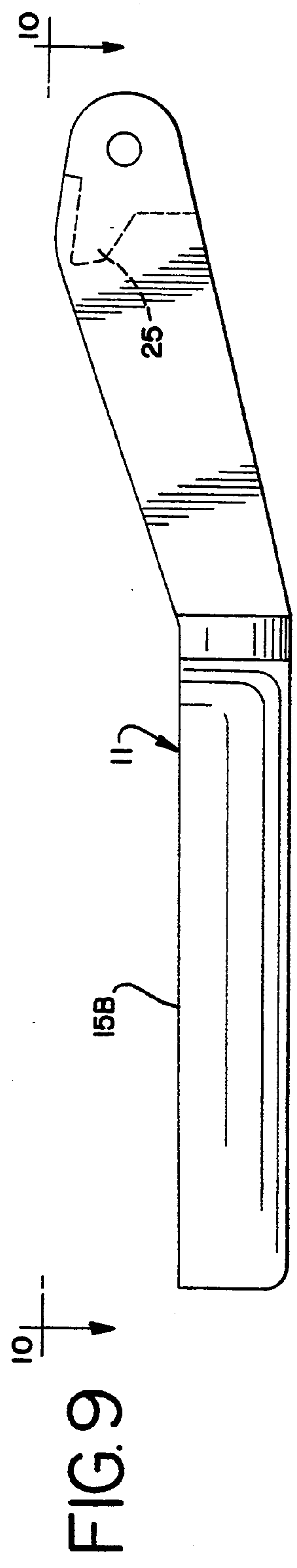
FIG. 9 is a side elevational view of the second part of the two part body of the tool shown in FIGS. 1-4.
Figure 10:
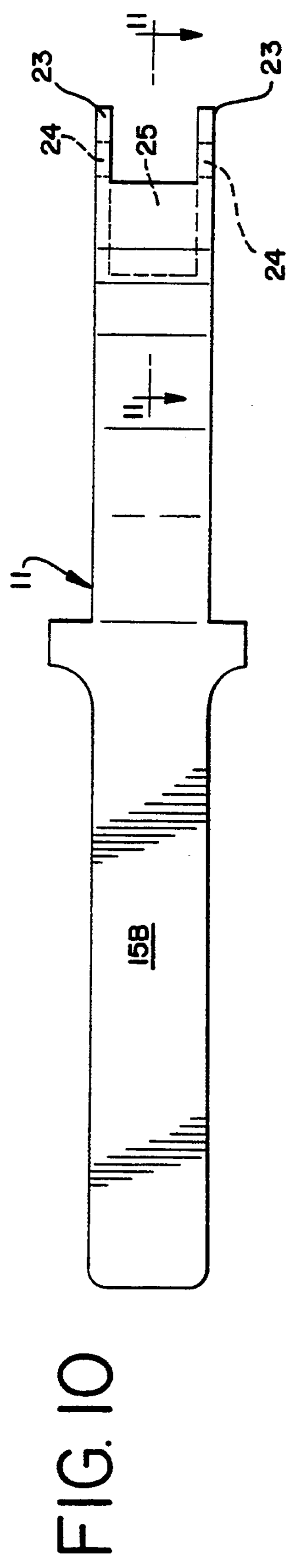
FIG. 10 is a plan view taken on line 10—10 of FIG. 9.
Figure 12:
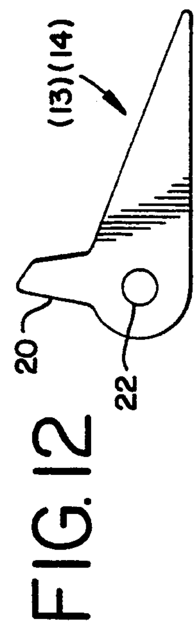
FIG. 12 is a view of one of the plurality of tines forming part of the tool of FIGS. 1-4.
Figure 11:
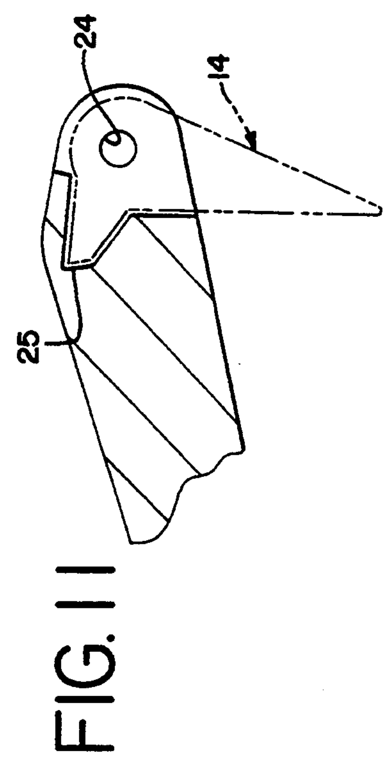
FIG. 11 is a fragmentary sectional view taken on line 11—11 of FIG. 10.

The mating body part 11 shown in FIGS. 9–11 provides a similar arrangement for holding the blade 7 as a relatively rigid transverse extension. Referring to FIGS. 9–11 the body part 11 includes a handle grip 15B on one end and the opposite end is bifurcated as indicated at 23—23. The bifurcated end is provided with aligned apertures 24 which register or align with the apertures 22 when the body parts 10 and 11 are pivotally interconnected by the pivot pin 16. As shown in FIG. 1, the bifurcated end 23 of body part 11 fits in the fulcrum end of body part 10. At its bifurcated end 23 the body part 11 has a pocket 25 for receiving the finger-like projections 20 (FIG. 12) on the laterally spaced tines 14 which form the blade 7. The pocket 25 serves to prevent the tines 14 from rotating or turning on the pin 16.

What I claim is:

1. A manual dual purpose garden tool which can function in a first way as a self-cleaning weeder by prying a weed up from the soil and in a second way as a self-cleaning cultivator by scarifying the soil top surface, comprising in combination, an elongated longitudinally split body formed of two elongated parts which are pivotally connected on a pivot axis adjacent one end so as to have a closed together mating condition in which they provide a single manipulating handle to be grasped in one hand of the user and to have a spread condition in which they provide separate manipulating handles to be separately grasped by the users two hands, each of said body parts having a blade mounted on its pivoted end, each said blade being formed by a plurality of laterally spaced tines with the tines on one blade interfitting in alternating relationship with the tines on the other blade on said pivot axis, one of said blades on one of said body parts being mounted thereon so as to form a generally longitudinal extension thereof and the other of said blades being mounted on the other body part so as to form a generally transverse extension thereof, whereby said blades intermesh and clean each other when said body parts are in their said spread condition and form said longitudinal and transverse extensions when said body parts are in their said closed together condition, said tool being self-cleaning after being used in either of said two ways by intermeshing said blades.

2. The garden tool of claim 1, wherein said body part having said blade as said longitudinal extension has a fulcrum formation adjacent its pivoted end.

3. The garden tool of claim 1, wherein said tines are interchangeable.

4. The garden tool of claim 1, wherein said tines are substantially identical.

5. The garden tool of claim 4, wherein the spacing of the tines in each said blade is substantially equal to the thickness of the blades in the other blade whereby the tines intermesh to form a substantially solid single blade.

6. The garden tool of claim 3, wherein each of said tines has an integral projection and each of said body parts has a pocket in which said projection fit so as to prevent each said blade from rotating with respect to said pivot axis.

7. The garden tool of claim 1, wherein when said two body parts are closed together they form a single one-hand grip on the end opposite said end at which they are pivotally connected, and said one-hand grip provides two one-hand grips when said body parts are separated.

8. The garden tool of claim 2, wherein said fulcrum formation has a transverse soil-engaging edge for forming a seed trough and for soil levelling.

* * * * *